United States Patent
Chao et al.

(10) Patent No.: US 7,565,635 B2
(45) Date of Patent: Jul. 21, 2009

(54) SiP (SYSTEM IN PACKAGE) DESIGN SYSTEMS AND METHODS

(75) Inventors: Clinton Chao, Hsinchu (TW); Louis Liu, Hsin-Chu (TW); Lewis Chu, Pingjhen (TW); Mark Shane Peng, Hsinchu (TW); Chao-Shun Hsu, Sansing Township, Yilan County (TW); Kim Chen, Fremont, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 196 days.

(21) Appl. No.: 11/697,744

(22) Filed: Apr. 9, 2007

(65) Prior Publication Data
US 2008/0250182 A1 Oct. 9, 2008

(51) Int. Cl.
G06F 17/50 (2006.01)
G06F 9/45 (2006.01)
(52) U.S. Cl. .............. 716/5; 716/4; 716/7; 716/16
(58) Field of Classification Search .......... 716/1–5, 716/7–18
See application file for complete search history.

(56) References Cited

U.S. PATENT DOCUMENTS

| 7,281,223 B2 * | 10/2007 | Kiel et al. ............ 716/4 |
| 2006/0236270 A1 * | 10/2006 | Delp et al. ............ 716/1 |
| 2007/0124709 A1 * | 5/2007 | Li et al. ............ 716/5 |

* cited by examiner

*Primary Examiner*—Thuan Do
*Assistant Examiner*—Nghia M Doan
(74) *Attorney, Agent, or Firm*—Thomas, Kayden, Horstemeyer & Risley

(57) ABSTRACT

SiP design systems and methods. The system comprises a system partitioning module, a subsystem integration module, a physical design module, and an analysis module. The system partitioning module partitions a target system into subsystem partitions according to partition criteria. The subsystem integration module generates an architecture design and/or a cost estimation for the target system according to the subsystem partitions, at least one SiP platform, and IC geometry data. The physical design module generates a SiP physical design with physical routing for the target system according to the architecture design, the subsystem partitions, the SiP platform, and the IC geometry data. The analysis module performs a performance check within the subsystem partitions based on the SiP physical design and/or simulations of the target system.

18 Claims, 2 Drawing Sheets

SIP (SYSTEM IN PACKAGE) DESIGN SYSTEMS AND METHODS

BACKGROUND OF THE INVENTION

1. Field of the Invention

The invention relates generally to SiP (System in Package), and more particularly to systems and methods for designing SiP.

2. Description of the Related Art

In the semiconductor industry, demands for low cost and high level integration of subsystems have driven the development of SiP technology.

A SiP integrates multiple ICs (Integrated Circuits) or dies in a single package. A SiP may contain one or more IC chips, passives, and other components conventionally disposed on the system board. SiP products are implementations of subsystems such as a GSM radio module comprising filters, a power amplifier, a transceiver, and a baseband processor or fully functional systems such as a cellular phone in an IC package level. Using SiP technology, a complete functional unit can be built in a highly integrated chip package with optimized cost, size and performance. End users benefit from a faster time-to-market, reduced cycle times for system design, flexibility, and others.

In a SiP design, traditional elements of package assembly, design aspects relating to the overall system functional requirements, manufacturing processes thereto, and others must be considered. A SiP design flow requires time-consuming consultation between customer and provider of SiP service to specify all elements such as cost and performance of system requirements. Conventionally, separation of SiP design into different SiP tools or even locations is inconvenient for designers. There is a need for an integrated platform from system partition to subsystem- or system-level analysis for SiP design.

BRIEF SUMMARY OF THE INVENTION

SiP design systems and methods are provided.

An embodiment of a SiP design system comprises a system partitioning module, a subsystem integration module, a physical design module, and an analysis module. The system partitioning module receives a target system, and partitions the target system into subsystem partitions according to partition criteria. The subsystem integration module generates an architecture design for the target system according to the subsystem partitions, at least one SiP platform, and IC (Integrated Circuit) geometry data. The physical design module generates a SiP physical design with physical routing for the target system according to the architecture design, the subsystem partitions, the SiP platform, and the IC geometry data. The analysis module performs a performance check within the subsystem partitions based on the SiP physical design.

In an embodiment of a SiP design method, a target system is first received. The target system is partitioned into subsystem partitions according to partition criteria. An architecture design for the target system is generated according to the subsystem partitions, at least one SiP platform, and IC geometry data. A SiP physical design with physical routing is generated for the target system according to the architecture design, the subsystem partitions, the SiP platform, and the IC geometry data. A performance check within the subsystem partitions is performed based on the SiP physical design.

SiP design systems and methods may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

SiP design systems and methods are provided.

Figure 1:
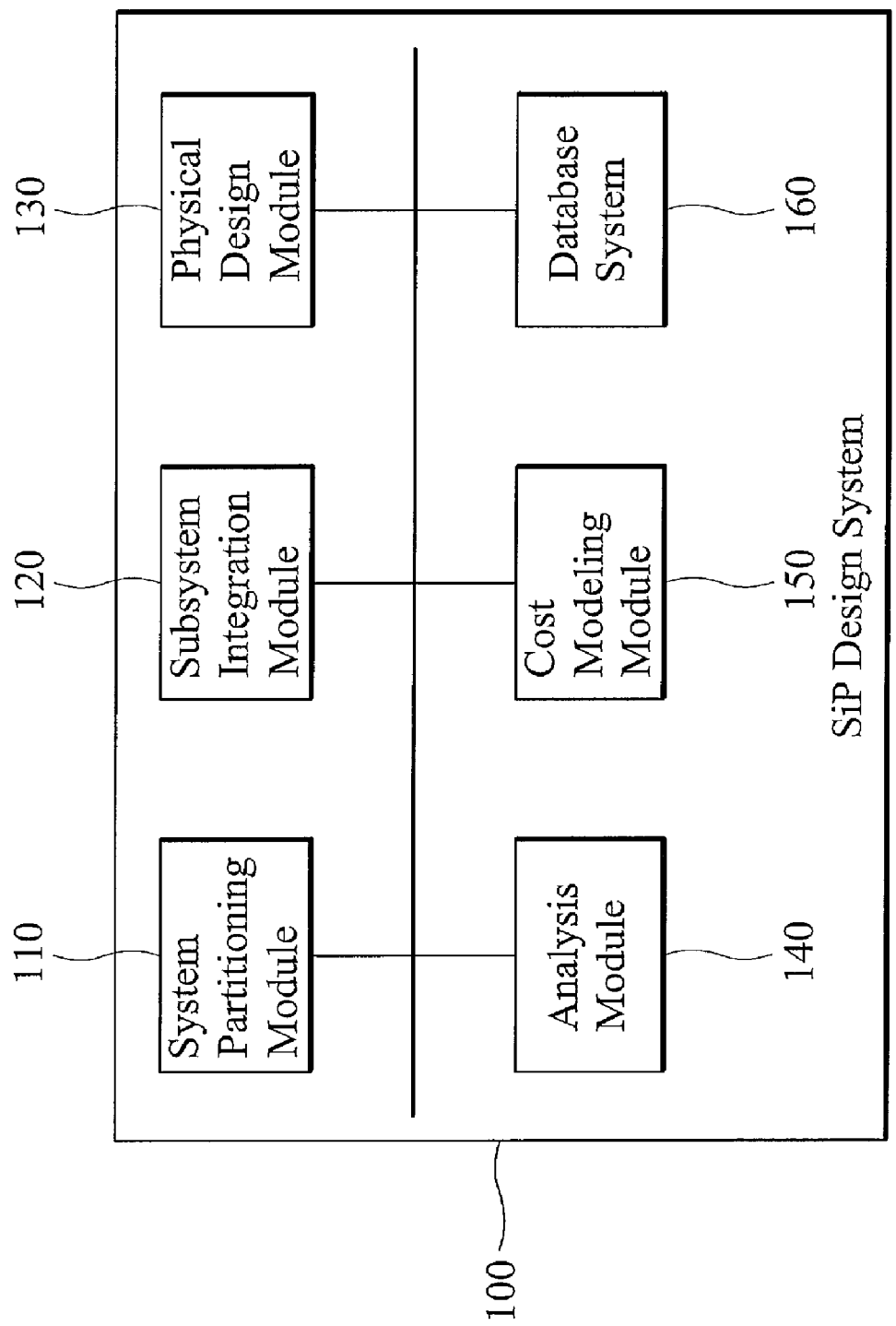
FIG. 1 is a schematic diagram illustrating an embodiment of a SiP design system.

FIG. 1 illustrates an embodiment of a SiP design system.

As shown in FIG. 1, the SiP design system 100 comprises a system partitioning module 110, a subsystem integration module 120, a physical design module 130, an analysis module 140, a cost modeling module 150, and a database system 160. The system partitioning module 110 receives a target system (system architecture), and partitions the target system into subsystem partitions using heuristics or partition criteria. The partition criteria comprise I/O line minimization, form factors such as ICs or light bulbs, mount, and assembly location, where distinct products of the same form factor might fit into the same socket, performance requirements, and others. It is understood that the target system refers to a final product and can exclude cosmetic aspects. For example, the target system may comprise a cellular phone, a media play device, and others. Additionally, a subsystem refers to a specific part or parts of a target system that connect together in a functional and useful way. For example, a subsystem can comprise a GSM radio comprising filters, a power amplifier, a transceiver, and a baseband processor.

The subsystem integration module 120 performs high-level SiP design decisions and rough cost estimations for the target system. The subsystem integration module 120 generates an architecture design for the target system according to the subsystem partitions, at least one SiP platform such as WB+FC stacked and FC MCM, IC geometry data, and a material and property database, where a number of substrate layer and substrate physical design rules are decided for the architecture design based on interface specifications of connection manners of respective dies, with related material and property information generated correspondingly. It is understood that several SiP platforms may be provided for selection in the design system. Additionally, the subsystem integration module 120 estimates a cost for the architecture design according to the subsystem partitions, the SiP platform, the IC geometry data, and the material and property information and cost information thereof. If the cost for the architecture design exceeds a cost target, the system partitioning module 110 re-partitions the target system, and the subsystem integration module 120 generates another architecture design for the target system accordingly.

The physical design module 130 generates a SiP physical design with physical placement and routing for the target system according to the architecture design, the subsystem partitions, the SiP platform, and the IC geometry data. The physical design with physical routing may be generated based on dies bump locations, bump-to-bump connections, and/or bump-to-ball connections, where the subsystem partitions may be stacked vertically or placed horizontally alongside one another inside the package, internally connected by fine wires that are buried in the package, or using solder bumps to join stacked chips together. It is understood that the physical design module 130 may provide 3D schematic entry tool for receive related parameters.

The analysis module 140 comprises a subsystem level analysis and a system level analysis. The analysis module 140 examines performance within the subsystem partitions on any critical path through the subsystem partitions. The analysis module 140 performs a performance check by performing electrical, thermal, mechanical, and/or thermo-mechanical simulations within the subsystem partitions based on the SiP physical design, material information, system critical paths, and others. The critical paths comprise propagation delay, crosstalk between traces, heat density budget, and/or solder joints within strain limits. Additionally, the analysis module 140 performs critical path simulations for the entire target system. The analysis module 140 performs electrical, thermal, mechanical, and/or thermo-mechanical simulations of the target system. Similarly, if the simulation result does not meet system specifications, the operations of the system partitioning module 110, the subsystem integration module 120, the physical design module 130, and the analysis module 140 are performed again.

The cost modeling module 150 calculates a cost for the SiP physical design with physical routing according to the complete SiP physical design, system block costs, assembly cost database, material cost database, and testing cost database. If the cost for the SiP physical design does not meet a system specification, the operations of the system partitioning module 110, the subsystem integration module 120, the physical design module 130, the analysis module 140, and the cost modeling module 150 are performed again. The database system 160 stores related data required for the SiP design system 100, such as IC information, SiP platforms, material property database, design rules, SiP reference and assembly flows, system critical paths, and related cost databases.

Figure 2:
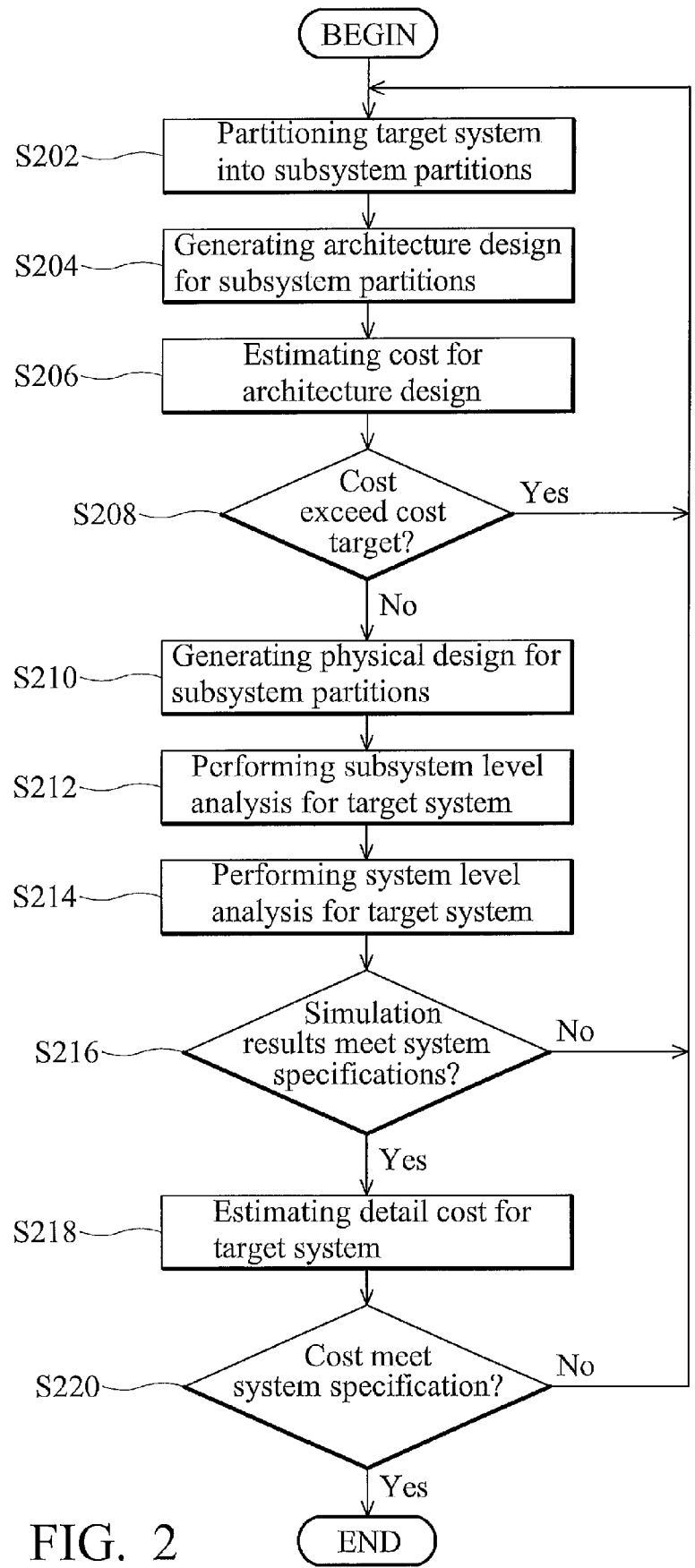
FIG. 2 is a flowchart of an embodiment of a SiP design method.

FIG. 2 is a flowchart of an embodiment of a SiP design method.

In step S202, a target system is partitioned into subsystem partitions using heuristics or partition criteria comprising I/O line minimization, form factors, and performance requirements. In step S204, an architecture design comprising the number of substrate layers and substrate physical design rules applied thereto is generated for the target system according to the subsystem partitions, SiP platforms, IC geometry data, and material and property database. In step S206, a cost is estimated for the architecture design according to the subsystem partitions, the SiP platform, the IC geometry data, and the material and property information and cost information thereof. In step S208, it is determined whether the estimated cost for the architecture design exceeds a preset cost target. If so, the procedure returns to step S202. If not, in step S210, a SiP physical design with physical placement and routing is generated for the target system according to the architecture design, the subsystem partitions, the SiP platform, and the IC geometry data. In step S212, a subsystem level analysis is performed for the target system, where electrical, thermal, mechanical, and/or thermo-mechanical simulations are performed within the subsystem partitions based on the SiP physical design, material information, system critical paths, and others. In step S214, a critical path analysis is performed for the target system at system level, where electrical, thermal, mechanical, and/or thermo-mechanical simulations of the target system are performed. In step S216, it is determined whether the simulation result meets preset system specifications. If not, the procedure returns to step S202. If so, in step S218, a detail cost for the SiP physical design with physical routing is estimated according to the complete SiP physical design, system block costs, assembly cost database, material cost database, and testing cost database. In step S220, it is determined whether the estimated cost meets a predetermined system specification. If not, the procedure returns to step S202. If so, the SiP design flow for the target system is complete.

As an example, IC company A designs an analog baseband processor (ABB) and a digital basedband processor (DBB) in a foundry of a SiP service provider. System company B wants to use the two chips, plus memory such as SRAM fabricated by company C, in a handset. The system partitioning module partitions a single package to integrate the three chips since the advantages of minimizing digital I/O traces on PCB, minimizing I/O interface power in dividing PCB traces, and shielding sensitive analog lines from other PCB noise sources. In this example, the subsystem integration module determines a package and physical structure, and a SiP platform. The configurations, chosen based on cost/performance considerations, may be a die on an organic substrate with the DBB flip-chip on the bottom, the SRAM wire bonded on top of the DBB, and an ABB wire bonded on top of the SRAM. The dies all connect down to the package substrate which is used to interconnect the different dies as well as connecting outside of the subsystem through BGA balls. Based on interface specifications of the connection manner of different dies, the number of substrate layers and the substrate physical design rules are determined. In this example, a 1-2-1 substrate is selected with minimum trace width/pitch of Xum/Yum, via pad of Zum on all layers, core thickness of Wum, and others. The architecture design leads to a rough cost estimation based on historic cost information of the same materials and design rules. The architecture design can be modified if the cost does not meet a preset cost target. After the cost comparison, the high-level architecture design and related inputs are provided to the physical design module to generate a SiP physical design with physical routing. Thereafter, the SiP physical design with physical routing is imported into the analysis module for analysis and verification. The analysis module takes some models for electrical, thermal, mechanical, and thermo-mechanical simulation, and runs simulations at the subsystem level (package/SiP). Some of the system critical paths are checked, for example, whether a propagation delay is too long, crosstalk between traces is too large, heat density can be managed within budget, solder joints will be within strain limits, and others. The analysis module then performs similar simulations for the entire system with more system blocks to ensure the SiP design is useful for the entire system. The simulation results can be compared to the predetermined system specifications to ensure all specifications are met. Finally, the cost modeling module estimates a cost for the complete SiP design. Once the cost meets the system specification, the SiP design is complete, and can be built.

SiP design systems and methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods.

When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A SiP design system, comprising:
a system partitioning module receiving a target system, and partitioning the target system into subsystem partitions according to partition criteria;
a subsystem integration module generating an architecture design for the target system according to the subsystem partitions, at least one SiP platform, and IC (Integrated Circuit) geometry data, and estimating a cost for the architecture design according to the subsystem partitions, the SiP platform, the IC geometry data, and material and property information and cost information thereof, wherein when the cost for the architecture design exceeds a cost target, the system partitioning module re-partitions the target system, and the subsystem integration module generates another architecture design for the target system accordingly;
a physical design module generating a SiP physical design with physical routing for the target system according to the architecture design, the subsystem partitions, the SiP platform, and the IC geometry data; and
an analysis module performing a performance check within the subsystem partitions based on the SiP physical design.

2. The system of claim 1 wherein the partition criteria comprise I/O line minimization.

3. The system of claim 1 wherein the subsystem integration module further determines a number of substrate layer and substrate physical design rules for the architecture design, and generates material and property information correspondingly.

4. The system of claim 1 wherein the physical design module further generates the SiP physical design with physical routing for the target system based on die bump locations, bump-to-bump connections, or bump-to-ball connections.

5. The system of claim 1 wherein the analysis module performs the performance check by performing electrical, thermal, mechanical, or thermo-mechanical simulations within the subsystem partitions.

6. The system of claim 1 wherein the analysis module further performs electrical, thermal, mechanical, or thermo-mechanical simulations of the target system.

7. A SiP (System in Package) design method, comprising:
receiving, by an SIP system, a target system;
partitioning, by an SIP system, the target system into subsystem partitions according to partition criteria;
generating, by an SIP system, an architecture design for the target system according to the subsystem partitions, at least one SiP platform, and IC (Integrated Circuit) geometry data;
estimating, by an SIP system, a cost for the architecture design according to the subsystem partitions, the SiP platform, the IC geometry data, and material and property information and cost information thereof;
checking, by an SIP system, whether the cost for the architecture design exceeds a cost target, and if so, re-partitioning the target system, and generating another architecture design for the target system accordingly;
generating, by an SIP system, a SiP physical design with physical routing for the target system according to the architecture design, the subsystem partitions, the SiP platform, and the IC geometry data; and
performing, by an SIP system, a performance check within the subsystem partitions based on the SiP physical design.

8. The method of claim 7 further comprising partitioning the target system into subsystem partitions according to the partition criteria comprising I/O line minimization.

9. The method of claim 7 further comprising deciding a number of substrate layer and substrate physical design rules for the architecture design, and generating material and property information correspondingly.

10. The method of claim 9 further comprising determining the number of substrate layers and the substrate physical design rules for the architecture design based on interface specifications of connection manners of respective dies.

11. The method of claim 7 further comprising generating the SiP physical design with physical routing for the target system based on die bump locations, bump-to-bump connections, or bump-to-ball connections.

12. The method of claim 7 further comprising performing the performance check by performing electrical, thermal, mechanical, or thermo-mechanical simulations within the subsystem partitions.

13. The method of claim 12 further comprising performing the performance check by analyzing performance within the subsystem partitions on at least one critical path through the subsystem partitions.

14. The method of claim 13 wherein the critical path comprises propagation delay, crosstalk between traces, heat density budget, or solder joints within strain limits.

15. The method of claim 7 further comprising performing electrical, thermal, mechanical, or thermo-mechanical simulations of the target system.

16. The method of claim 15 further comprising determining whether a result of the performance check meets at least one system specification, and if not, re-partitioning the target system, re-generating the architecture design and the SiP physical design, and performing the performance check again until the result of the performance check meets the system specification.

17. The method of claim 7 further comprising calculating a cost for the SiP physical design with physical routing, and determining whether the cost meets a system specification, and if not, re-generating the architecture design and the SiP physical design, performing the performance check, and calculating a cost for the SiP physical design with physical routing again until the cost meets the system specification.

18. A machine-readable storage medium comprising a computer program, which, when executed, causes a device to perform a SiP (System in Package) design method, the method comprising:
receiving a target system;
partitioning the target system into subsystem partitions according to partition criteria;
generating an architecture design for the target system according to the subsystem partitions, at least one SiP platform, and IC (Integrated Circuit) geometry data;

estimating a cost for the architecture design according to the subsystem partitions, the SiP platform, the IC geometry data, and material and property information and cost information thereof;

checking whether the cost for the architecture design exceeds a cost target, and if so, re-partitioning the target system, and generating another architecture design for the target system accordingly;

generating a SiP physical design with physical routing for the target system according to the architecture design, the subsystem partitions, the SiP platform, and the IC geometry data; and performing a performance check within the subsystem partitions based on the SiP physical design.

* * * * *